US008074109B1

(12) United States Patent
Roffe

(10) Patent No.: US 8,074,109 B1
(45) Date of Patent: Dec. 6, 2011

(54) THIRD-PARTY VOTING TO SELECT A MASTER PROCESSOR WITHIN A MULTI-PROCESSOR COMPUTER

(75) Inventor: James Roffe, Lino Lakes, MN (US)

(73) Assignee: Unisys Corporation, Blue Bell, PA (US)

( * ) Notice: Subject to any disclaimer, the term of this patent is extended or adjusted under 35 U.S.C. 154(b) by 852 days.

(21) Appl. No.: 11/599,565

(22) Filed: Nov. 14, 2006

(51) Int. Cl.
*G06F 11/00* (2006.01)

(52) U.S. Cl. .......... 714/11; 710/267; 710/268; 710/269; 714/10; 714/12; 714/13

(58) Field of Classification Search ............ 326/11; 710/267–269; 714/10–13
See application file for complete search history.

(56) References Cited

U.S. PATENT DOCUMENTS

| | | | | |
|---|---|---|---|---|
| 4,710,926 A * | 12/1987 | Brown et al. | | 714/4 |
| 5,193,175 A * | 3/1993 | Cutts et al. | | 714/11 |
| 5,276,823 A * | 1/1994 | Cutts et al. | | 714/11 |
| 5,317,726 A * | 5/1994 | Horst | | 714/12 |
| 5,369,767 A * | 11/1994 | Dinwiddie et al. | | 710/264 |
| 5,384,906 A * | 1/1995 | Horst | | 713/375 |
| 5,388,242 A * | 2/1995 | Jewett | | 711/113 |
| 5,423,024 A * | 6/1995 | Cheung | | 714/11 |
| 5,845,060 A * | 12/1998 | Vrba et al. | | 714/12 |
| 5,890,003 A * | 3/1999 | Cutts et al. | | 710/263 |
| 6,163,849 A * | 12/2000 | Nouri et al. | | 713/324 |
| 6,629,268 B1 * | 9/2003 | Arimilli et al. | | 714/42 |
| 7,095,342 B1 * | 8/2006 | Hum et al. | | 341/67 |
| 7,398,380 B1 * | 7/2008 | Lovett et al. | | 713/1 |
| 2003/0023680 A1 * | 1/2003 | Shirriff | | 709/204 |
| 2003/0131197 A1 * | 7/2003 | Morrison | | 711/130 |
| 2003/0131291 A1 * | 7/2003 | Morrison et al. | | 714/54 |
| 2005/0050398 A1 * | 3/2005 | Rao et al. | | 714/39 |
| 2005/0081201 A1 * | 4/2005 | Aguilar et al. | | 718/100 |
| 2005/0223302 A1 * | 10/2005 | Bono | | 714/55 |
| 2006/0010344 A1 * | 1/2006 | Zorek et al. | | 714/13 |
| 2007/0169046 A1 * | 7/2007 | Gordy et al. | | 717/151 |
| 2007/0294363 A1 * | 12/2007 | Friedrich et al. | | 709/217 |
| 2007/0294601 A1 * | 12/2007 | Chitsaz et al. | | 714/55 |

OTHER PUBLICATIONS

Mehhotra, "Dealing with partial failures in multiple processor primary-backup systems" 1997, ACM, pp. 371-378.*

* cited by examiner

*Primary Examiner* — Robert Beausoliel, Jr.
*Assistant Examiner* — Jeison C Arcos
(74) *Attorney, Agent, or Firm* — Robert P. Marley; Beth L. McMahon

(57) ABSTRACT

Techniques are described of using votes of third-party components to select a master processor from a plurality of redundant processors. A master processor and a standby processor maintain communications with one another. If communication between the master processor and the standby processor fails, the processors may poll a set of registered voters to determine which of the processors is to be the master processor. In this way, the processors may determine which of the processors is to be master without the use of a shared indicator to specify which of the processors is to be the master processor.

19 Claims, 7 Drawing Sheets

THIRD-PARTY VOTING TO SELECT A MASTER PROCESSOR WITHIN A MULTI-PROCESSOR COMPUTER

TECHNICAL FIELD

The invention relates to computer processors, and particularly to redundancy of computer processors.

BACKGROUND

Contemporary computers may include multiple processors that cooperate to perform complex computational tasks. In a mainframe computer architecture, for example, multiple processors may be grouped into multiple cells. Each of the cells in a mainframe computer may perform one or more computational tasks independently or in cooperation with the other cells. Furthermore, a mainframe computer may include a service processor to manage the cells. For instance, the service processor may be responsible for allocating workload among the various cells of the mainframe computer.

SUMMARY

In general, the invention is directed to techniques of using votes of third-party components to select a master processor from a plurality of redundant processors within a multi-processor computer.

The techniques may be applied to a multi-processor mainframe computer that utilizes redundant service processors to manage a plurality of cells. For example, in some embodiments of the invention, a master service processor and one or more redundant standby service processors maintain communications with one another. If the master service processor fails, one of the redundant service processors may quickly assume the role previously performed by the failed master service processor. In this way, users of the mainframe computer may experience little or no performance degradation due to the failure of the original service processor.

If communication between the master service processor and the standby service processor fails or if one of the service processors starts and is unable to communicate with the other one of the service processors, the service processors may poll a set of "registered voters" to determine which of the service processors is to be the master service processor. As used herein, the term "registered voters" is used to refer to a component within the multi-processor computer that is ineligible to become a master service processor, but that contributes to the selection of the master service processor. For example, components within the various cells of the mainframe (e.g., control modules or processors within the cells) may be utilized as registered voters to select a new master service processor in the event the current master processor fails or communication between the master service processor and the standby service processors fails. In this way, the service processors may determine which of the service processors is to be master. Moreover, this approach may also avoid the requirement that a shared indicator be used to specify which of the service processors is to be the master service processor, where the shared indicator is stored in a common persistent storage unit that is accessible by all of the service processors.

For example, one or more software components executing on the processors within the cells of the mainframe computer may register themselves as voters to a pair of redundant service processors that manage the cells. When the master service processor receives a registration request, the master service processor updates a set of registered voters in a persistent storage module associated with a redundant standby service processor and in a persistent storage module associated with the master service processor.

Subsequently, the service processors may lose communication with each other. The service processors may lose communication with each other for several reasons including processor failure or a failure of the physical communication link between the processors. In this event, the individual service processors independently poll voters registered in their respective sets to obtain votes from the voters. In this context, a voter may provide a "vote" to a service processor by providing the redundancy state most recently written to the voter by one of the service processors. The redundancy state indicates whether a service processor is "eligible" to operate as the master service processor. A redundancy state may indicate that a service processor is "eligible" to operate as the master service processor when the redundancy state indicates that the service processor is either the current master service processor or indicates that the persistent storage module of the service processor is current. If a service processor is able to obtain votes from more than 50% of the voters registered in its persistent storage module and all of these votes indicate that the service processor is eligible to operate as the master service processor, the service processor may begin operating as the master service processor. The service processor may then instruct the voters within the mainframe cells registered with the service processor that the service processor is now operating as the current master service processor.

In one embodiment, a method comprises determining, with a first processor, whether the first processor is able to communicate with a second processor. In this embodiment, the first processor and the second processor are redundant processors within a multi-processor system. The method also comprises obtaining, with the first processor, votes from components within the multi-processor system that are registered as voters with the first processor. The votes are obtained when the first processor is unable to communicate with the second processor. The components are external to the first processor and the second processor and ineligible to operate as a master processor for the redundant processors. In addition, the method comprises operating, with the first processor, as a master processor when the first processor is able to obtain votes from more than a predetermined portion of the voters registered with the first processor and all of the votes indicate that the first processor is eligible to operate as the master processor. In one embodiment, the predetermined portion of voters is half of those voters.

In another embodiment, a system comprises a first processor that is capable of performing a set of tasks, a second processor that is also capable of performing the set of tasks, a plurality of components that are external to the first processor and the second processor and are ineligible to operate as a master processor of the first processor and the second processor, and a communications interconnect to facilitate communication among the first processor, the second processor, and the plurality of components. In this embodiment, the first processor comprises a communication detection module to determine whether the first processor is able to communicate with a second processor. The first processor also comprises a polling module to obtain votes from ones of the components that are registered as voters with the first processor. The polling module obtains the votes when the communication detection module determines that the first processor is unable to communicate with the second processor. The first processor also comprises a master processor module to operate as a master processor when the polling module is able to obtain votes from more than a predetermined portion, such as half, of the voters registered with the first processor and all of the votes indicate that the first processor is eligible to operate as the master processor.

In another embodiment, a mainframe computer comprises a plurality of cells. Each of the cells comprises a processor cluster to perform substantive computational tasks of the mainframe computer, a baseboard management controller to manage an interface between system management software and hardware components of cells, and a control module to coordinate services performed by the processor cluster of the cell. In addition, the mainframe computer comprises a first processor capable of performing a set of service processing tasks, a second processor also capable of performing the set of service processing tasks, and a means for facilitating communication among the first processor, the second processor, and the plurality of components. Furthermore, the mainframe computer comprises a means for determining whether the first processor is able to communicate with a second processor. In addition, the mainframe computer comprises a means for obtaining votes from baseboard management controllers and control modules in the cells that are registered in a persistent storage module of the first processor. The means obtains the votes when the first processor is unable to communicate with the second processor. The mainframe computer also comprises a means for automatically configuring the first service processor to operate as a master processor when the means is able to obtain votes from more than a predetermined portion, such as half, of the voters registered with the first processor and all of the votes indicate that the first processor is eligible to operate as the master processor.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
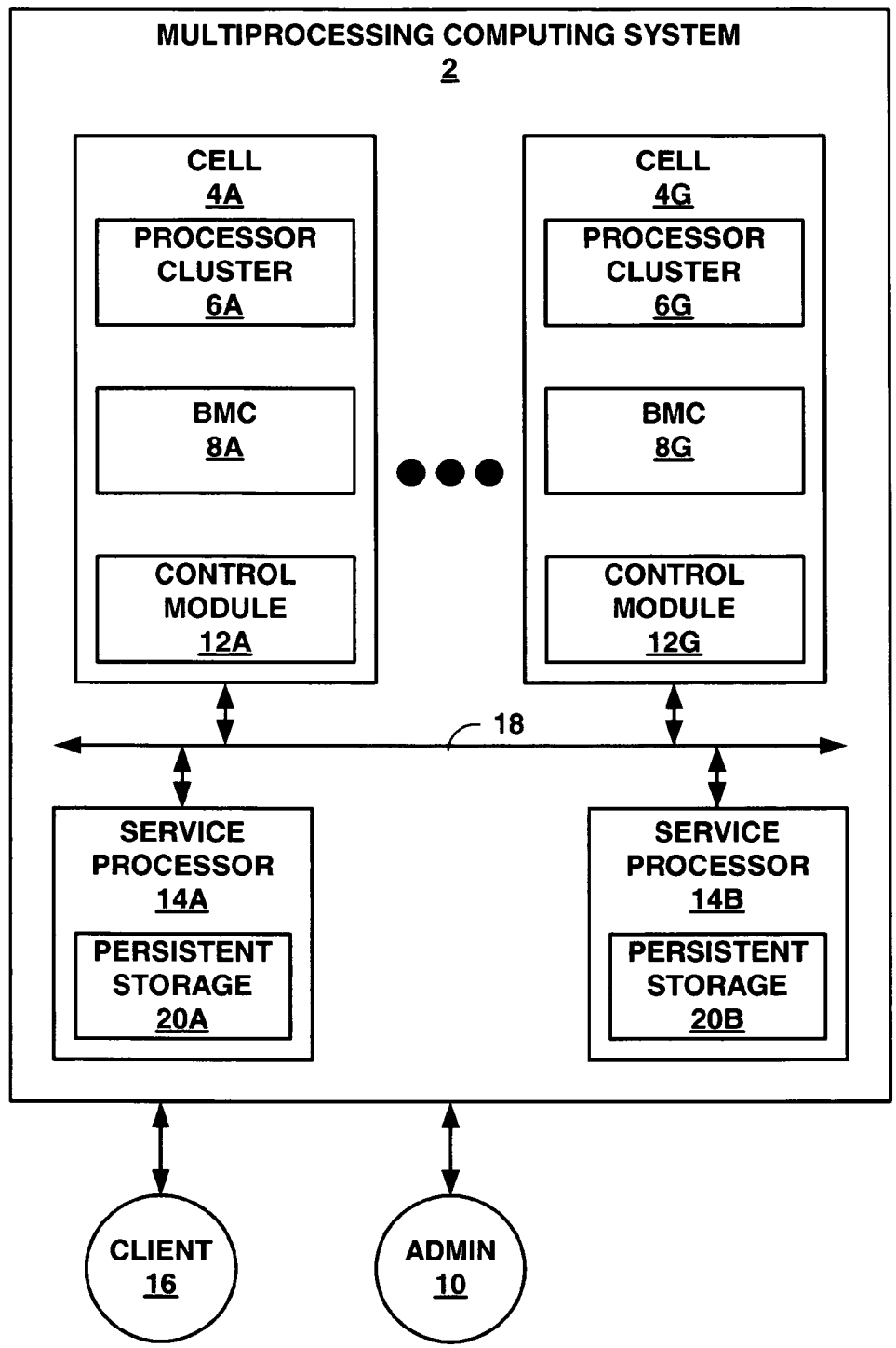
FIG. 1 is a block diagram illustrating an exemplary multi-processing computing system that uses votes of third-party components to select a master service processor from a plurality of redundant service processors.

FIG. 1 is a block diagram illustrating an exemplary multiprocessing computing system 2 that uses votes of third-party components to select a master service processor from a plurality of redundant service processors. In the example of FIG. 1, multiprocessing computing system (MCS) 2 may be one of several different types of computing device. For instance, MCS 2 may be a mainframe computer, a personal computer, a server, an intermediate network device, a gaming platform, a mobile device, or otherwise.

In the example of FIG. 1, MCS 2 includes a set of cells 4A through 4G (collectively, "cells 4"). One embodiment of MCS 2 includes eight cells. Each of cells 4 may be composed of the same hardware and may have similar capabilities and performance profiles.

Cells 4A through 4G include processor clusters 6A through 6G, respectively. Processor clusters 6A through 6G (collectively, "processor clusters 6") may include a plurality of microprocessors to perform substantive computational tasks of MCS 2. For example, processor clusters 6 may include microprocessors based on the 32-bit x86 architecture, the 36-bit 2200-series architecture produced by Unisys Corp. of Blue Bell, Pa., or otherwise. Examples of substantive computation tasks performed by processors clusters 6 may include managing e-business transactions, modeling and simulation of real-world phenomena, providing web services, providing application services, airline flight routing, and so on.

In addition to processor clusters 6, cells 4A through 4G may also include Baseboard Management Controllers (BMCs) 8A through 8G, respectively. BMCs 8A through 8G (collectively, "BMCs 8") may be specialized microcontrollers embedded on a motherboard of cells 4A through 4G, respectively. BMCs 8 may manage an interface between system management software and hardware components of cells 4. For instance, BMCs 8 may monitor temperature sensors in cells 4. In addition, an administrator 10 may remotely interact with BMCs 8 to reset or cycle power in respective ones of cells 4.

Cells 4A through 4G may also include control modules 12A through 12G, respectively. Control modules 12A through 12G (collectively, "control modules 12") may manage or coordinate services performed by processor clusters 6A through 6G, respectively. While BMCs 8 and control modules 12 are involved in the master processor selection process described below, BMCs 8 and control modules 12 do not contend to become the master service processor. That is, BMCs 8 and control modules 12 are generally ineligible to become a master service processor.

More specifically, in addition to cells 4, MCS 2 includes service processor 14A and service processor 14B (collectively, "service processors 14"). Service processor 14A and service processor 14B are generally capable of performing the same set of tasks. In other words, service processors 14 are redundant with one another. Service processors 14A and 14B may include persistent storage modules 20A and 20B, respectively. Persistent storage modules 20A and 20B (collectively, "persistent storage modules 20") may be flash memory units, hard disk drives, tape drives, optical media, or otherwise. The one of service processors 14 that is the master service processor (MSP) controls access to cells 4. For example, a client 16 may interact with the MSP to request that MCS 2 perform some computing task. In response to the request from client 16 to perform the task, the MSP may assign one or more of cells 4 to perform the task. In some embodiments, a processor in one of cells 4 may perform the functionality of service processor 14A and a processor in a different one of cells 4 may perform the functionality of service processor 14B. In such embodiments, MCS 2 may be simpler because more processors are concentrated in interchangeable cells.

An interconnect 18 facilitates communication between service processor 14A and service processor 14B, between cells 4, and between service processors 14 and cells 4. In various embodiments, interconnect 18 may be a hardware bus, a local area network, or otherwise.

In the architecture of MCS 2, only one of service processors 14 may be a MSP at any given time. That is, service processor 14A and service processor 14B may not be a MSP simultaneously. At the same time, if either of service processors 14 is capable of operating as the MSP, one of service processors 14 should operate as the MSP. Initially, service processors 14 may start up and begin communicating with each other using interconnect 18. In this case, service processors 14 may negotiate which one of service processors 14 is to be the MSP and which one of service processors 14 is to be the standby service processor (SSP).

Because service processors 14 may fail independently of one another and because service processors 14 may lose communication with one another, MCS 2 employs a voting scheme to select one of service processors 14 to operate as the MSP when service processors 14 cannot communicate with one another. In general, when one of service processors 14 is unable to communicate with the other one of service processors 14, the service processor may only operate as the MSP when the service processor is able to obtain votes from more than a predetermined number or percentage of the voters registered with the first processor and all of those votes indicate that the service processor is eligible to operate as the MSP. For purposes of the remaining disclosure, this predetermined number or percentage is described as "half" of the voters, although a different number or percentage may be used in the alternative, such as two-thirds, etc.

In some embodiments, when BMCs 8 and control modules 12 start up, BMCs 8 and control modules 12 send requests to service processors 14 to register as "voters." Other components internal or external to MCS 2 not illustrated in the example of FIG. 1 may also send requests to service processors 14 to register as voters. For instance, individual processors within processor clusters 6 may register as voters.

When the one of service processors 14 operating as the MSP receives a request to register to vote, the MSP instructs the requesting component to record a redundancy state that indicates a redundancy status for the first processor and a redundancy status for the second processor. For example, if the MSP is able to communicate with the SSP, the MSP instructs the requesting component to store the redundancy state identifying the service processor acting as the MSP as the MSP, and indicating that the persistent storage module of the SSP is current. If the MSP is unable to communicate with the SSP, the MSP instructs the requesting component to store the redundancy state identifying the service processor operating as the MSP as the MSP and indicating that the persistent storage module of the SSP is not current. Upon receiving the instruction to store the redundancy state, the newly registered voter records the redundancy state, possibly overwriting a previously received redundancy state.

After the MSP instructs the requesting component to store the redundancy state, and when the MSP is able to communicate with the one of service processors operating as the SSP, the MSP sends instructions to the SSP to update a set of registered voters in the persistent storage module of the SSP to include a reference to the one of BMCs 8 or control modules 12 that is registering to vote. Alternatively, when the MSP determines that one of BMCs 8 or control modules 12 that has already registered to vote has failed and the MSP is able to communicate with the SSP, the MSP may send instructions to the SSP to update a set of registered voters in the persistent storage module of the SSP to remove a reference to the failed component. For instance, if service processor 14A is the MSP, service processor 14A may instruct service processor 14B to update its set of registered voters in its local, persistent storage module 20B. In this way, the MSP registers the voter with the SSP. After the MSP registers the voter with the SSP, the local persistent storage module of the SSP contains a set of registered voters that is current as of the last time that the MSP and the SSP were able to successfully communicate. If the MSP receives confirmation from the SSP that the SSP has successfully updated the set of registered voters, the MSP may update a set of registered voters in its own persistent storage module. In other words, the MSP registers the voter with the MSP.

If the MSP is unable to communicate with the SSP before determining that the number of registered voters has changed, the MSP continues operating as the MSP. However, if the MSP determines that the MSP cannot communicate with the SSP (e.g., the MSP did not receive a confirmation from the SSP), the MSP requests a redundancy state from each of the voters registered in the persistent storage module of the MSP. If the MSP is not able to obtain a redundancy state from at least 50% of the voters registered in the persistent storage module of the MSP, the MSP may terminate. There may be several reasons why the one of service processors 14 is not able to obtain a redundancy state from more than 50% of the voters registered in the persistent storage module of the service processor. For instance, some of the voters may have ceased functioning. In other cases, the voters may refuse to communicate with the service processor because the voters are already communicating with a service processor operating as the MSP. In some embodiments, the voters may refuse to communicate with the service processor by refusing to open a Transmission Control Protocol (TCP) socket with the service processor. In this case, the MSP may terminate because, without obtaining redundancy states from at least 50% of the voters registered in the persistent storage module of the MSP, the MSP has no assurance that the SSP is not able to start operating as the MSP.

On the other hand, if the MSP is able to obtain redundancy states from at least 50% of registered voters, the MSP determines whether all of the obtained redundancy states indicate that the MSP is eligible to operate as the MSP. In other words, when a voter provides one of service processors 14 with a redundancy state that indicates that the service processor is "eligible" to operate as the MSP, the voter is "voting" for the service processor. Stated otherwise, a "vote" is a redundancy state from a voter that indicates whether a service processor is eligible to operate as the MSP. One of service processors 14 is "eligible" to operate as the MSP when the redundancy state indicates that the service processor is either the current MSP or indicates that the persistent storage module of the service processor is current.

If all of the obtained redundancy states indicate that the service processor is eligible to operate as the MSP, the MSP writes to the persistent storage module of the MSP a flag that indicates that the MSP is to continue operating as the MSP regardless of whether the MSP is able to obtain redundancy states from less than 50% of voters registered in the persistent storage module of the MSP. In this way, the MSP may continue to operate as the MSP despite a gradual attrition of registered voters (e.g., BMCs 8 and control modules 12). After writing the flag in its persistent storage module, the MSP writes to each of the voters registered in the persistent storage module of the MSP a redundancy state that indicates that this service processor is the MSP and that the persistent storage module of the SSP is not current.

In addition to receiving requests to register to vote, the MSP may detect changes in hardware data. The MSP may use the hardware data to manage cells 4. For instance, the MSP may detect that cell 4G has ceased functioning, that a cooling fan of one of cells 4 is performing abnormally, that a partition is active, that a drive has been mounted, and so on. The MSP may then allocate work among cells 4 in accordance with the hardware data.

When the MSP detects a change in the hardware data, the MSP may instruct the SSP to write the change in the hardware data to its persistent storage module. If the MSP receives confirmation from the SSP that the SSP has successfully written the change in the hardware data to its persistent storage module, the MSP may then write the change in the hardware data to its own persistent storage module. If the MSP does not receive confirmation from the SSP that the SSP has successfully written the change in the hardware data to its persistent storage module, the MSP may infer that SSP has failed or that the communication link between the MSP and the SSP has failed. In this case, the MSP may write the change in the hardware data to its own persistent storage module. In addition, the MSP requests that each of the voters registered in the persistent storage module of the MSP provide the MSP with redundancy states. If the MSP receives redundancy states from at least 50% of the voters registered in the persistent storage module of the MSP, the MSP determines whether all of the received redundancy states indicate that the MSP is eligible to operate as the MSP. If all of the received redundancy states indicate that the MSP is eligible to operate as the MSP, the MSP updates its own persistent storage module with a flag that indicates that the MSP may continue operating as the MSP even if the MSP is subsequently unable to obtain redundancy states from more than 50% of the voters registered with the MSP. In addition, the MSP may instruct each voter registered in the persistent storage module of the MSP to record a redundancy state that indicates that this service processor is the MSP and that the persistent storage module of the SSP is not current. If the MSP does not receive redundancy states from at least 50% of the voters registered in the persistent storage module of the MSP or if at least one received redundancy state indicates that the MSP is not eligible to operate as the MSP, the MSP may terminate.

When one of service processors 14 that is not operating as the MSP determines that the service processor is unable to communicate with the other one of service processors 14, the non-MSP service processor is unable to determine the status of the other one of service processors 14. That is, the non-MSP service processor is unable to determine whether the other one of service processors 14 is currently the MSP, has failed, has terminated, believes that the non-MSP service processor is the MSP, or otherwise. Because one of service processors 14 should operate as MSP if either of service processors 14 is able to operate as MSP, the non-MSP service processor determines whether it is eligible to operate as the MSP.

To determine whether the non-MSP service processor is eligible to operate as the MSP, the non-MSP service processor polls the voters registered with the non-MSP service processor. That is, the non-MSP service processor requests a redundancy state from each voter registered in the persistent storage module of the non-MSP service processor.

If more than 50% of voters registered with the non-MSP service processor respond to the request for redundancy states, the non-MSP service processor determines whether each of the responding voters provided the non-MSP service processor with a redundancy state that indicates the non-MSP service processor is eligible to operate as the MSP. As discussed above, a redundancy state may indicate that a service processor is eligible to operate as the MSP when the redundancy state indicates that the service processor is currently the MSP or indicates that the persistent storage module of the service processor is current.

If all of the responding voters provided the non-MSP service processor with a redundancy state indicating that the non-MSP service processor is eligible to operate as the MSP, the service processor may update its local persistent storage module 20 to indicate that this service processor is now operating as the MSP and that the persistent storage module 20 of the other service processor is not current. Now, operating as the MSP, the service processor may instruct each voter registered with the service processor to record a redundancy state that indicates that this service processor is operating as the MSP and that the persistent storage module of the other service processor is not current.

This invention may provide one or more advantages. For example, the techniques may avoid the requirement of commonly accessible storage memory to store data that indicates which of service processors 14 are to operate as the MSP. Such a fixed location may become unavailable to one or more service processors or may be associated with unnecessary hardware. In some embodiments, the voting scheme described herein may allow an MSP to be selected in a reliable manner without necessarily requiring the use of such a fixed location in hardware that is commonly accessible by all service processors 14.

Figure 2:
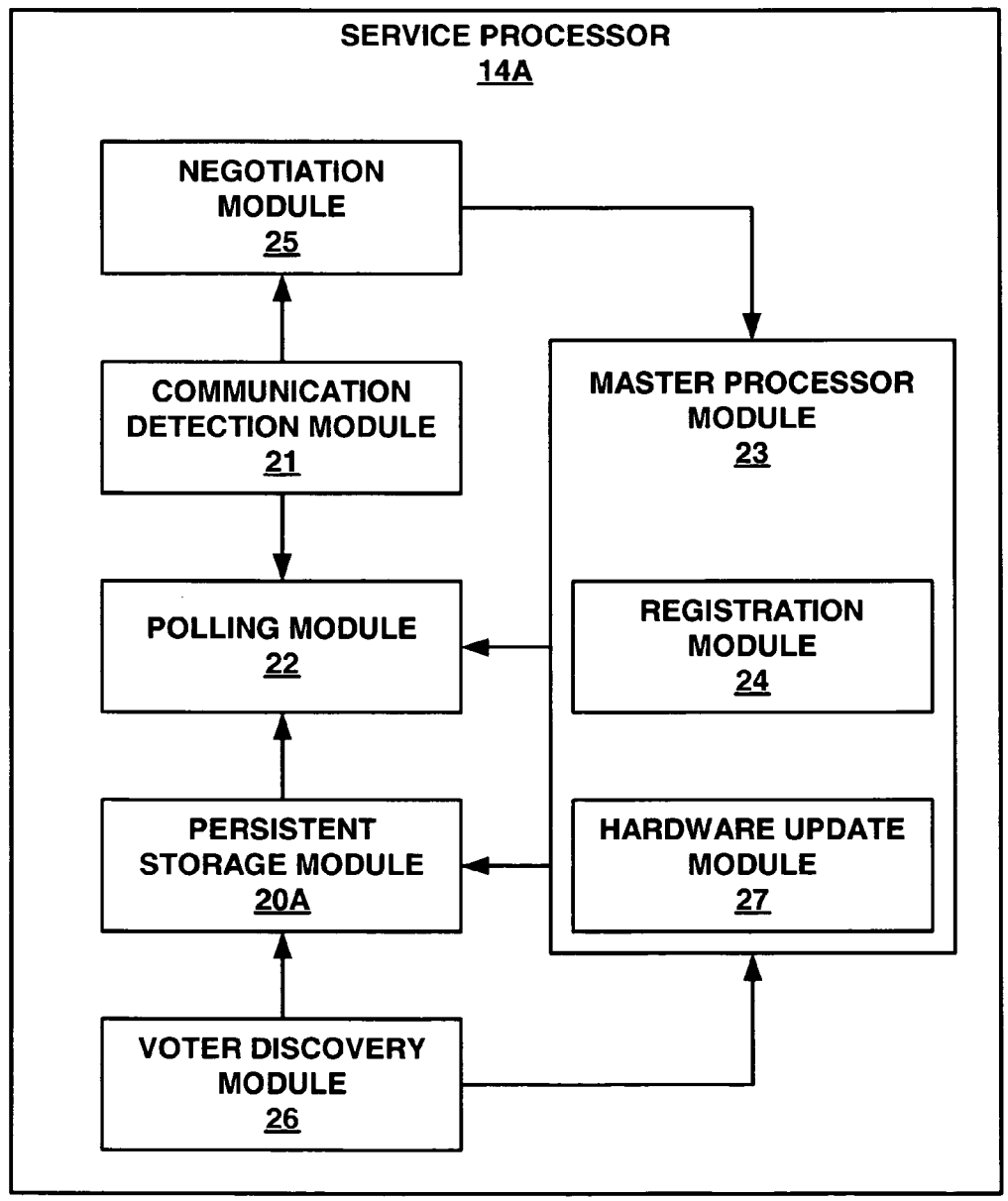
FIG. 2 is a block diagram illustrating an exemplary service processor that may contain one or more embodiments of the invention.

FIG. 2 is a block diagram illustrating an exemplary service processor 14A that may contain one or more embodiments of the invention. As illustrated in FIG. 2, service processor 14A includes a communication detection module 21 to determine whether service processor 14A is able to communicate with service processor 14B. For instance, communication detection module 21 may determine whether service processor 14A is able to communicate with service processor 14B when service processor 14A starts up. In addition, communication detection module 21 may periodically send keep-alive messages to service processor 14B to determine whether service processor 14A is able to communicate with service processor 14B. When communication detection module 21 determines that service processor 14A is unable to communicate with service processor 14B, communication detection module 21 may send an alert to a polling module 22 in service processor 14A.

When polling module 22 receives an alert from communication detection module 21, polling module 22 may obtain votes from BMCs 8 and control modules 12 that are registered as voters with service processor 14A. If polling module 22 is able to obtain votes from more than half of the voters registered with service processor 14A and all the votes indicate that service processor 14A is eligible to operate as the MSP, a master processor module 23 in service processor 14A may operate as MSP.

As illustrated in the example of FIG. 2, master processor module 23 includes a registration module 24. When master processor module 23 is operating as MSP, registration module 24 receives requests to register as voters from BMCs 8 and control modules 12. In response to the requests, registration module 24 may instruct service processor 14B to update a set of voters registered with service processor 14B. After instructing service processor 14B to update the set of voters, registration module 24 may determine whether service processor 14B successfully updated the set of voters registered with service processor 14B. In addition, registration module 24 may update a set of voters registered with service processor 14A. When registration module 24 determines that service processor 14B did not successfully update the set of voters registered with service processor 14B, polling module 22 polls the voters registered with service processor 14A. Master processor module 23 may continue to operate as the MSP when polling module 22 is able to obtain votes from at least half of the voters registered with service processor 14A and all of the votes indicate that service processor 14A is eligible to operate as the MSP.

Master processor module 23 also includes a hardware update module 27. Hardware update module 27 may detect a change in hardware data of MCS 2. When hardware update module 27 detects the change, hardware update module 27 instructs service processor 14B to write the change in the hardware data to persistent storage module 20B. If hardware update module 27 determines that service processor 14B did not successfully write the change to persistent storage module 20B, hardware detection module 27 requests that polling module 22 obtain votes from the voters registered in persistent storage module 20A. Master processor module 23 may continue operating as the MSP when polling module 22 is able to obtain votes from more than half of the voters registered in persistent storage module 20A and all of the votes indicate that master processor module 23 is eligible to operate as the MSP. If master processor module 23 is able to continue operating as the MSP, master processor module 23 may instruct each voter registered in persistent storage module 20A to record a redundancy state that indicates that service processor 14A is operating as the MSP and that persistent storage module 20B is not current.

When service processor 14A starts up and communication detection module 21 determines that service processor 14A is able to communicate with service processor 14B, a negotiation module 25 in service processor 14A may negotiate whether service processor 14A or service processor 14B is to operate as the MSP. When negotiation module 25 negotiates with service processor 14B that master processor module 23 is to operate as the MSP, negotiation module 25 may send an alert to master processing module 23. Master processing module 23 may then begin operating as the MSP.

When automatic redundancy is not configured, a voter discovery module 26 in service processor 14A discovers voters in MCS 2. After discovering voters, voter discovery module 26 may determine whether all of the discovered voters approve the first processor as the MSP. When all of the discovered voters approve the first processor as the MSP, voter discovery module 26 may send an alert to master processor module 23. After receiving the alert, master processing module 23 may operate as the MSP.

Figure 3:
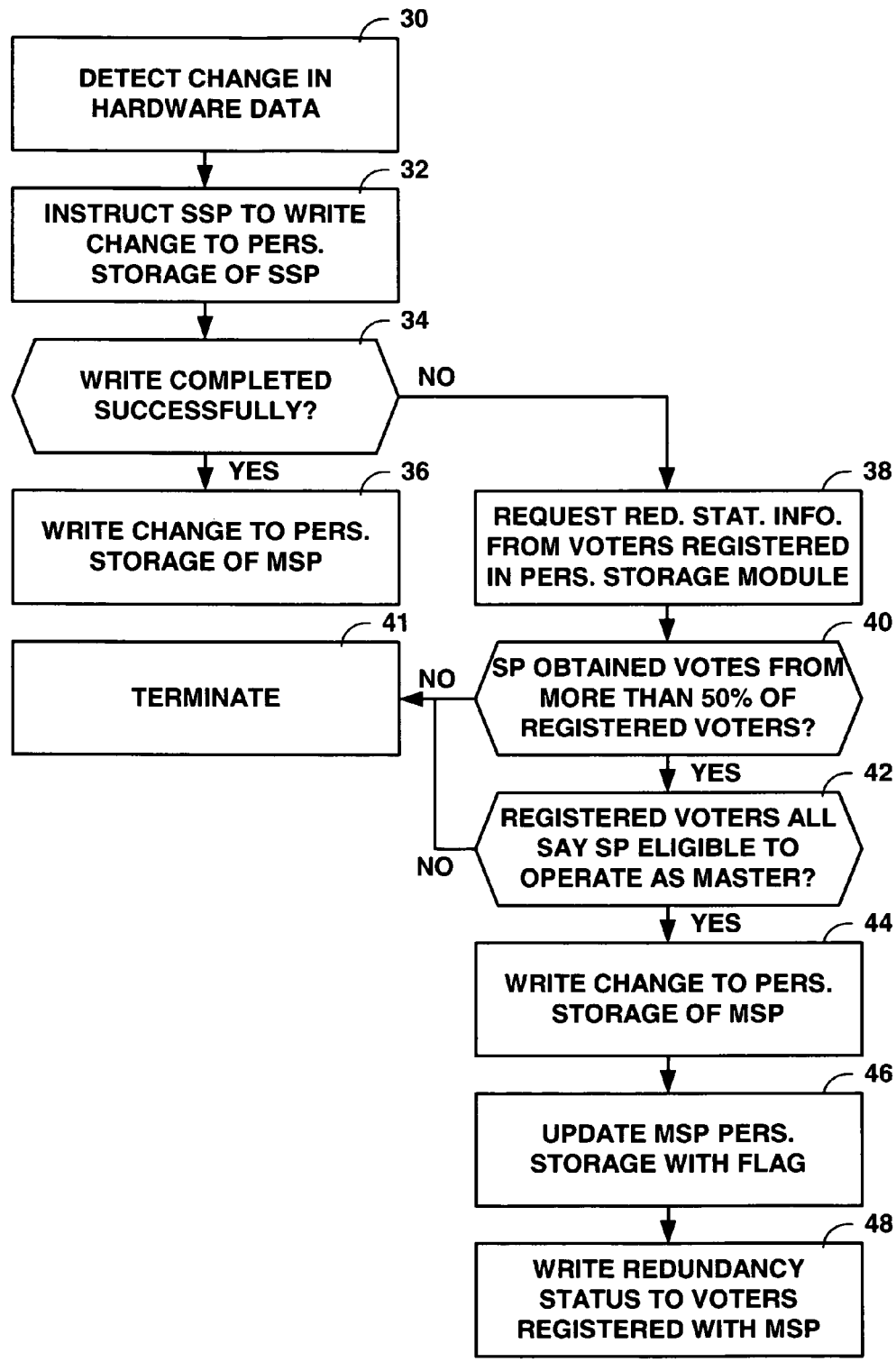
FIG. 3 is a flowchart illustrating an exemplary operation of a master service processor upon detection of a change in hardware data.

FIG. 3 is a flowchart illustrating an exemplary operation of a master service processor upon detection of a change in hardware data. Initially, the one of service processors 14 operating as the MSP detects a change in hardware data of MCS 2 (30). After detecting the change, the MSP instructs the SSP to write the change in hardware data to a hardware data file in the persistent storage module 20 of the SSP (32). The MSP then determines whether the SSP successfully wrote the change in hardware data to the hardware data file in persistent storage module 20 of the SSP (34). For example, the SSP may send the MSP a confirmation message that the SSP has successfully written the change. In some embodiments, the SSP may maintain two separate hardware data files in the persistent storage module 20 of the SSP. When the SSP receives an instruction to update the hardware data, the SSP determines which one of the two hardware data files is the current hardware data file. The SSP then overwrites the non-current hardware data file with a copy of the current hardware data file and applies the update to the copy of the current hardware data file that overwrote the non-current hardware data file. If the SSP successfully completes this process, the SSP may indicate that the updated hardware data file is now the current hardware data file. In this way, the SSP only indicates that a hardware data file is a current hardware data file if the write process to the persistent storage module was completed successfully.

If the SSP successfully completed the write to the persistent storage module 20 of the SSP ("YES" of 34), the MSP may write the change in hardware data to a hardware data file in the persistent storage module of the MSP (36). On the other hand, if the SSP did not successfully complete the write to the persistent storage module 20 of the SSP ("NO" of 34), the MSP requests redundancy states from each of the voters registered with the MSP (38). The MSP then determines whether the MSP obtained redundancy states from at least 50% of the voters registered with the MSP (40). If the MSP did not obtain redundancy states from at least 50% of the voters registered with the MSP ("NO" of 40), the MSP may generate an error and terminate (41). If the MSP was able to obtain redundancy states from at least a predetermined portion of the voters registered with the MSP ("YES" of 40), which in one embodiment is 50% of the voters, the MSP determines whether all of the obtained redundancy states indicate that the MSP is eligible to operate as the MSP (42). If not all of the obtained redundancy states indicate that the MSP is eligible to operate as the MSP, ("NO" of 42), the MSP may generate an error and terminate (41). If all of the obtained redundancy states indicate that the MSP is eligible to operate as the MSP ("YES" of 42), the MSP may continue to operate as the MSP. The MSP may then write the change in hardware data to the persistent storage module of the MSP (44). After writing the change in hardware data, the MSP writes a flag in the persistent storage module of the MSP that indicates that the MSP may continue operating as the MSP regardless of whether the MSP is subsequently able to obtain votes from 50% of the voters registered with the MSP (46). The MSP may then instruct each voter registered in the persistent storage module of the MSP to record a redundancy state that indicates that the service processor operating as the MSP is still the MSP and that the persistent storage module 20 of the SSP is not current (48).

Figure 4:
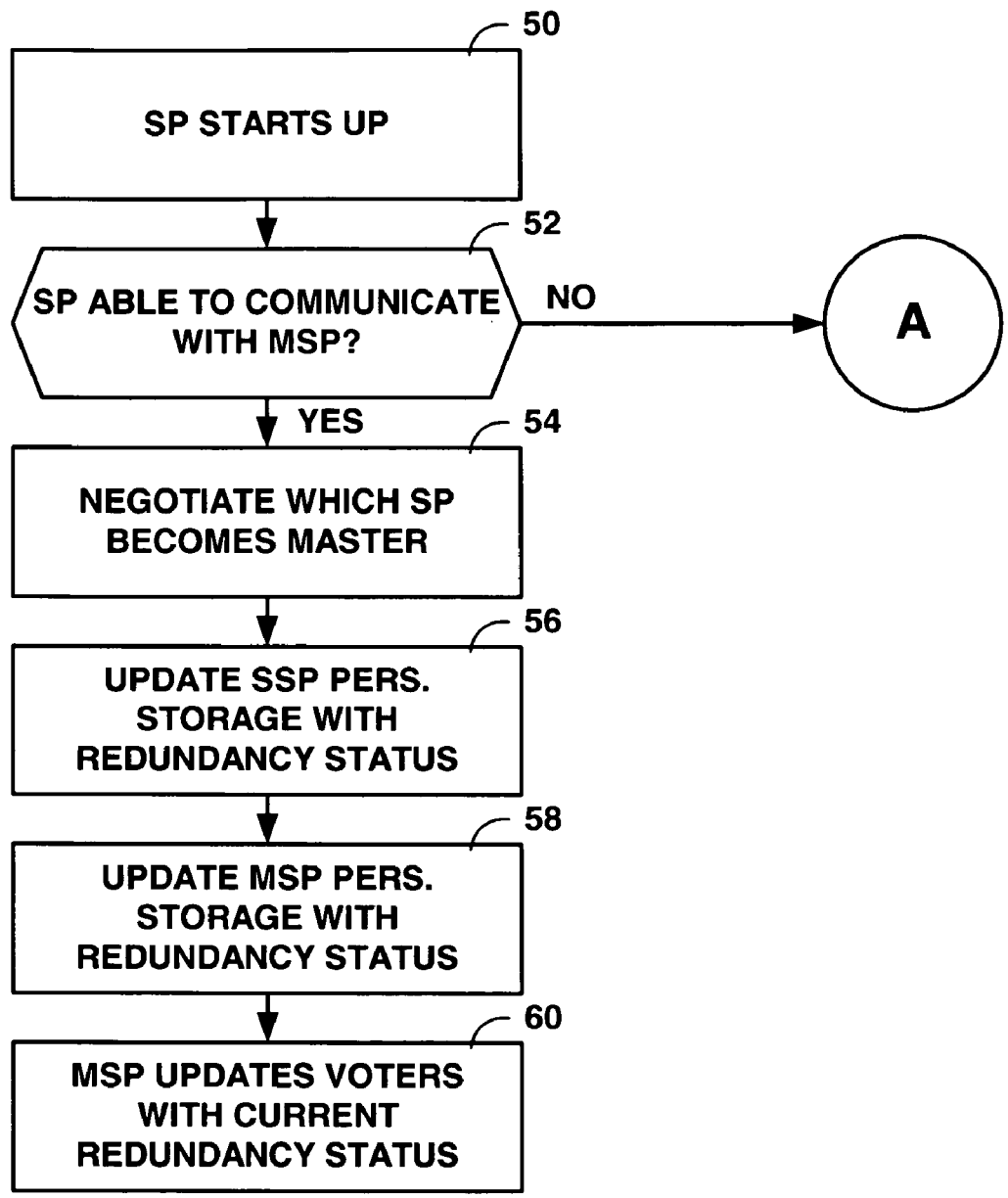
FIG. 4 is a flowchart illustrating an exemplary operation of a service processor when the service processor is able to communicate with the other service processor.

FIG. 4 is a flowchart illustrating an exemplary operation of a service processor when the service processor is able to communicate with the other service processor. Initially, one of service processors 14 may start up, i.e., upon power-up, as a non-MSP processor (50). Thus, at this stage, the service processor is not currently operating as the MSP. Initially, the non-MSP service processor determines whether the non-MSP service processor is able to communicate with the other one of service processors 14 (52). In the event communication fails, the non-MSP service processor may operate in accordance with the example flowchart of FIG. 5 ("NO" of 52).

If the non-MSP service processor is able to communicate with the other one of service processors 14 ("YES" of 52), the service processor negotiates with the other one of service processors 14 to determine which one of the service processors is to operate as the MSP (54). For example, if the other one of service processors 14 is already operating as the MSP, the other one of service processors 14 may instruct the service processor to remain as the SSP. In another example, if the other one of service processors 14 is not already operating as the MSP, service processors 14 may use one or more criteria to determine which one is to operate as the MSP. For instance, the one of service processors 14 with the lower serial number or the earlier starting time may become the MSP.

If service processors 14 determine that the non-MSP service processor is to operate as the MSP, the service processor that is now newly-operating as the MSP instructs the other one of service processors 14 (now operating as the SSPs) to write in the persistent storage module of the SSPs that the instructing service processor is now operating as the MSP (56). The MSP then writes in its persistent storage module that it is the MSP (58). The MSP then instructs each voter registered in the persistent storage module of the MSP to record a redundancy state that indicates that this service processor is the MSP and that the persistent storage module of the SSP is current (60).

Figure 5:
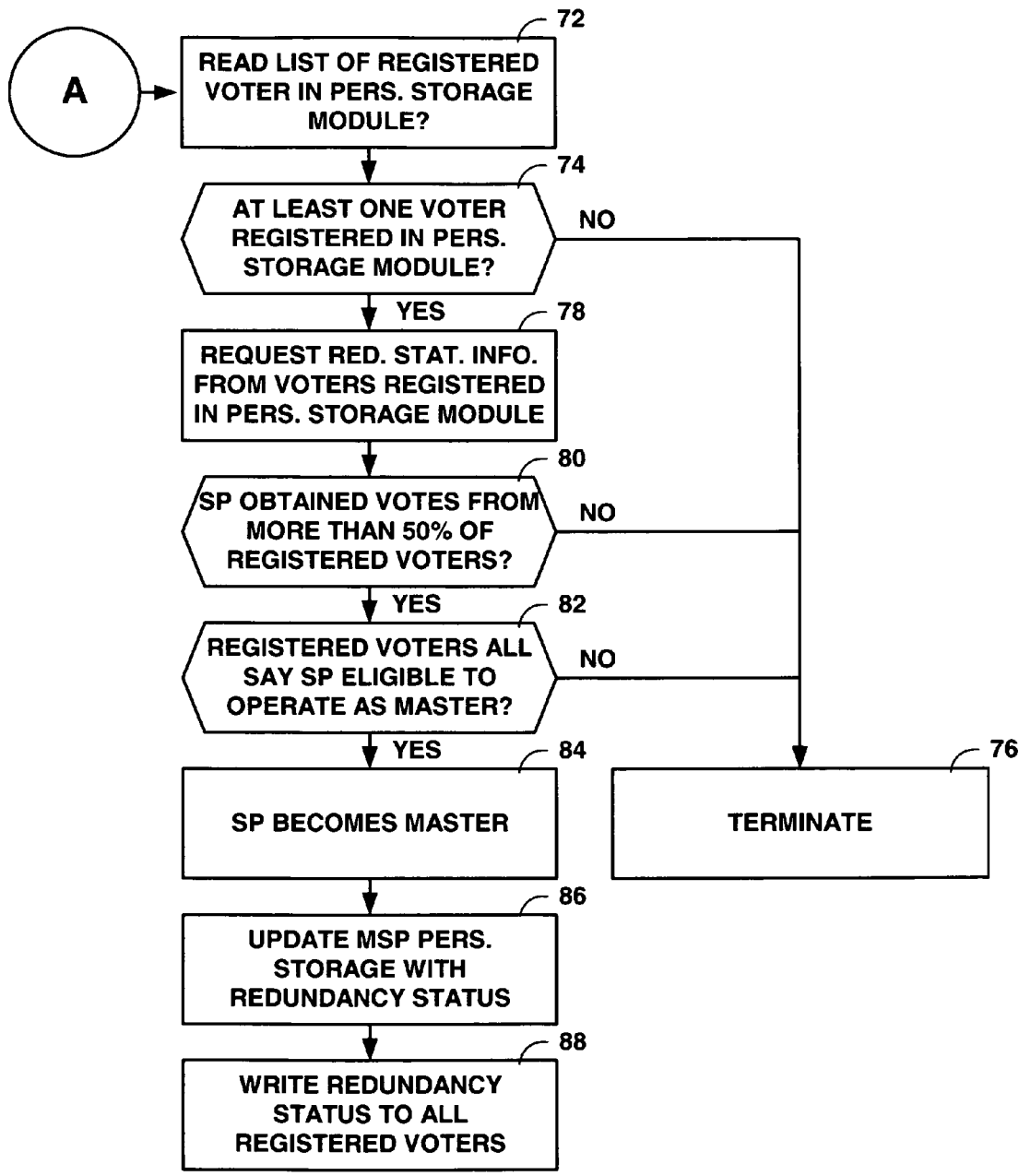
FIG. 5 is a flowchart illustrating an exemplary operation of a service processor when the service processor determines that the service processor is unable to communicate with the other service processor.

FIG. 5 is a flowchart illustrating an exemplary operation of a service processor when the service processor determines that the service processor is unable to communicate with the other service processor. Upon determining that the non-MSP service processor cannot communicate with the other one of service processors 14, the non-MSP service processor reads a set of registered voters stored in the local persistent storage module 20 of the non-MSP service processor (72). The non-MSP service processor then determines whether there is at least one voter registered in the persistent storage module of the non-MSP service processor (74). If there is not at least one voter registered in the persistent storage module of the non-MSP service processor ("NO" of 74), the non-MSP service processor may generate an error and terminate (76). Otherwise, if there is at least one voter registered in the persistent storage module of the non-MSP service processor ("YES" of 74), the non-MSP service processor may request a redundancy state from each of the voters registered in the persistent storage module of the non-MSP service processor (78).

After requesting a redundancy state from the voters registered in the persistent storage module of the non-MSP service processor, the non-MSP service processor determines whether the non-MSP service processor was able to obtain a redundancy state from more than 50% of the voters registered in the persistent storage module of the non-MSP service processor (80). If the non-MSP service processor has not obtained a redundancy state from more than 50% of the voters registered in the persistent storage module of the non-MSP service processor ("NO" of 80), the non-MSP service processor may generate an error and terminate (76).

On the other hand, if the non-MSP service processor has obtained a redundancy state from more than 50% of voters registered in the persistent storage module of the non-MSP service processor ("YES" of 80), the non-MSP service processor determines whether each of the responding voters provided the non-MSP service processor with a redundancy state that indicates that the non-MSP service processor is eligible to operate as the MSP (82).

If the non-MSP service processor determines that at least one responding voter provided a redundancy state that does not indicate that the non-MSP service processor is eligible to operate as the MSP ("NO" of 82), the non-MSP service processor may terminate or continue operating as an SSP (76). However, if each one of the voters provided a redundancy state that indicates that the non-MSP service processor is eligible to operate as the MSP ("YES" of 82), the non-MSP service processor begins operating as the MSP (84).

Subsequently, the new MSP writes to the persistent storage module of the new MSP that the new MSP is the MSP and that the persistent storage module of the other one of service processors 14 is not current (86). The new MSP may then instruct each of the voters registered in the persistent storage module to record a redundancy state that indicates that the MSP is the MSP and that the persistent storage module of the other service processor is not current (88).

Figure 6:
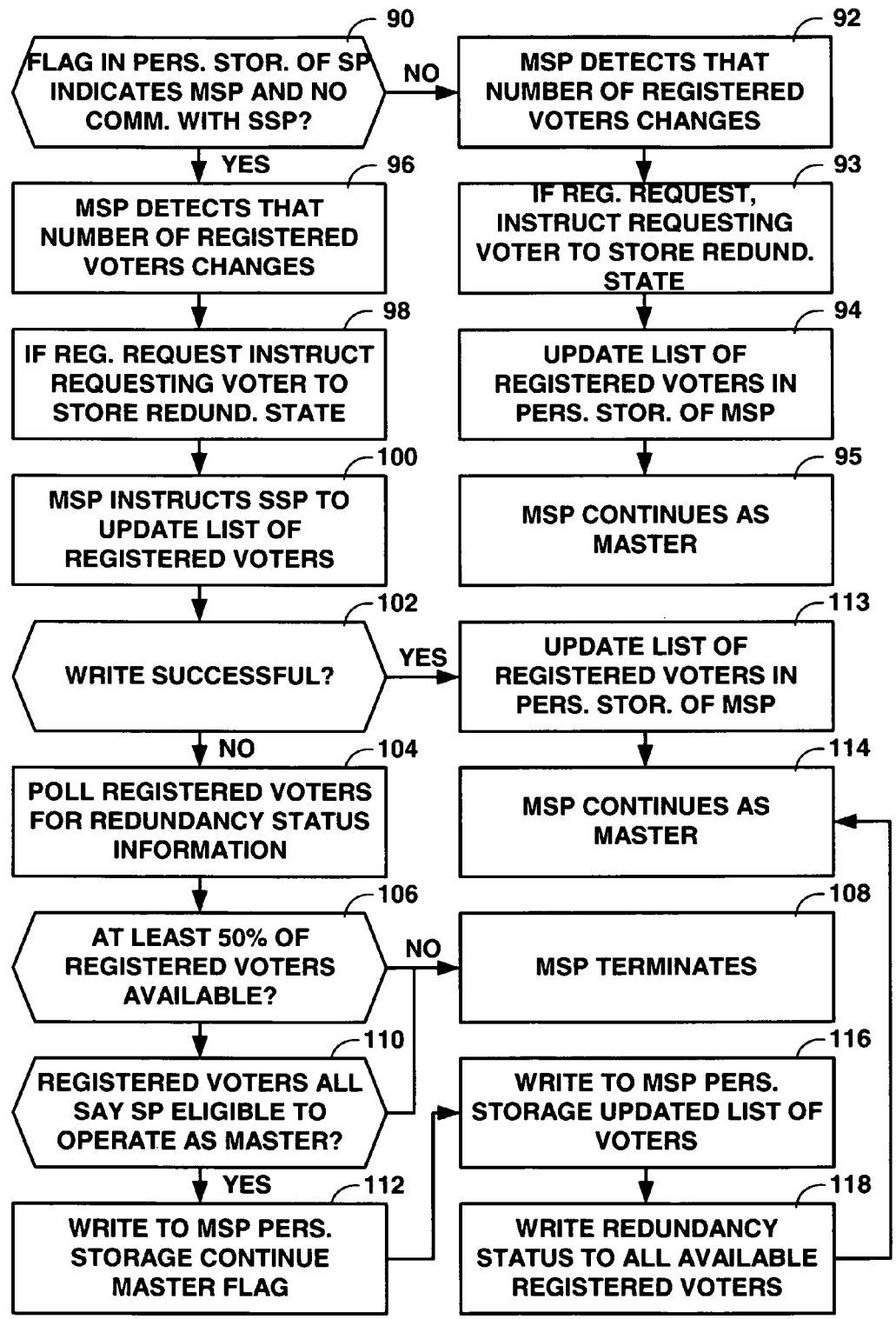
FIG. 6 is a flowchart illustrating an exemplary operation of a master service processor when the number of registered voters changes.

FIG. 6 is a flowchart illustrating an exemplary operation of a master service processor when the number of registered voters changes. Initially, one of service processors 14 operating as the MSP determines whether a flag in the persistent storage module of the service processor indicates that the service processor is operating as the MSP and that the MSP is not able to communicate with the SSP (90). If the flag indicates that the MSP is not able to communicate with the SSP ("NO" of 90), the MSP may subsequently determine that the number of registered voters has changed (92). For example, the MSP may determine that one of the registered voters has ceased functioning. If the number of registered voters has changed because a voter is registering, the MSP instructs the registering voter to record a redundancy state that indicates that this processor is the MSP and that the persistent storage module of the SSP is not current (93). After instructing the registering voter to record the redundancy state, the MSP may update the set of registered voters in the persistent storage module of the MSP (94). The MSP continues to operate as the MSP (95).

If the MSP is able to communicate with the SSP ("YES" of 90), the MSP may also subsequently determine that the number of registered voters has changed (96). However, if the MSP is able to communicate with the SSP and the MSP receives a request to register to vote, the MSP instructs the registering voter to record a redundancy state that indicates that this processor is the MSP and that the persistent storage module of the SSP is current (98). The MSP then instructs the SSP to update the set of registered voters in the persistent storage module of the SSP (100). The MSP may then determine whether the SSP successfully updated the set of registered voters in the persistent storage module of the SSP (102).

If the MSP determines that the SSP did not successfully update the set of registered voters in the persistent storage module of the SSP ("NO" of 102), the MSP may conclude that communication with the SSP has been lost. The MSP may then poll the voters registered in the persistent storage module of the MSP to obtain redundancy states (104). After polling the voters registered in the persistent storage module of the MSP, the MSP may determine whether the MSP has received a redundancy state from at least 50% of the voters registered in the persistent storage module of the MSP (106). If the MSP did not receive a redundancy state from at least 50% of the voters registered in the persistent storage module of the MSP ("NO" of 106), the MSP may generate an error and terminate (108). If the MSP received a redundancy state from at least 50% of the voters registered in the persistent storage module of the MSP ("YES" of 106), the MSP determines whether all of the received redundancy states indicate that the MSP is eligible to operate as the MSP (110). If the MSP determines that not all of the received redundancy states indicate that the MSP is eligible to operate as the MSP ("NO" of 110), the MSP may generate an error and terminate (108). On the other hand, if the MSP determines that all of the received redundancy states indicate that the MSP is eligible to operate as the MSP ("YES" of 110), the MSP may write to the persistent storage module of the MSP a flag that indicates that this service processor may continue operating as the MSP even if the MSP is subsequently unable to obtain a redundancy state from more than 50% of voters registered in the persistent storage module of the MSP (112). The MSP may then write to the persistent storage module of the MSP an updated list of the voters registered with the MSP (116). After writing the updated list of voters to the persistent storage module of the MSP, the MSP may instruct each of the voters registered in the persistent storage module of the MSP to record a redundancy state that indicates that this service processor is the MSP and that the persistent storage module of the SSP is not current (118). The MSP may then continue operating as the MSP (114).

If the MSP determines that the SSP successfully updated the set of registered voters in the persistent storage module of the SSP ("YES" of 100), the MSP updates the set of registered voters in the persistent storage module of the MSP (113). The MSP then writes to the persistent storage module of the MSP a redundancy state that indicates that this service processor is the MSP and that the persistent storage module of the SSP is current (114). The MSP may then continue operating as the MSP (116).

Figure 7:
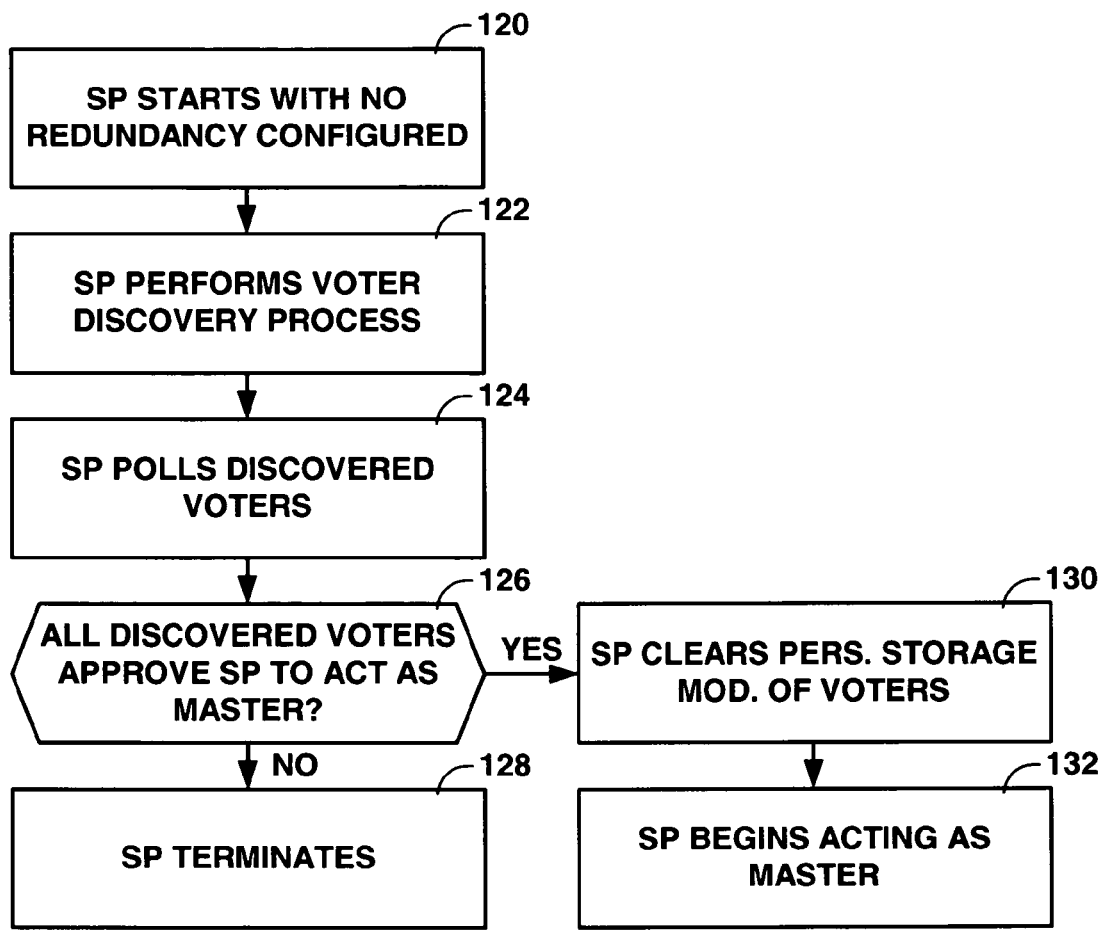
FIG. 7 is a flowchart illustrating an exemplary operation of a service processor when the service processor starts operation and redundancy is not configured.

FIG. 7 is a flowchart illustrating an exemplary operation of a service processor when the service processor starts and redundancy is not configured. For example, administrator 10 may configure MCS 2 not to use the automatic redundancy scheme described above. Rather, administrator 10 may manually select one of service processors 14 to operate as the MSP. When administrator 10 manually selects one of service processors 14 to operate as the MSP, service processors 14 do not attempt to communicate with one another. However, in some cases administrator 10 may inadvertently configure both of service processors 14 as the MSP. As a safety check for this condition, service processors 14 may perform the following process.

Initially, one of service processors 14 may start up and detect that automatic redundancy is not configured (120). The service processor may then perform a voter discovery process to detect the presence of voters in MCS 2 (122). For instance, the service processor may attempt to send messages via interconnect 18 to BMCs 8 and control modules 12. After completing the voter discovery process, the service processor may poll each of the discovered voters (124).

If the service processor determines that not all of the discovered voters approve the service processor to operate as the MSP ("NO" of 124), the service processor may terminate (126). For example, a discovered voter may not approve the service processor to operate as the MSP if another service processor is already in communication with the voter. On the other hand, if the service processor determines that all of the discovered voters approve the service processor to operate as the MSP ("YES" of 124), the service processor may clear the persistent storage module of the service processor of the set of discovered voters (128). The service processor may do this in order to enable administrator 10 to switch automatic redundancy on and off. After clearing the persistent storage module of the set of discovered voters, the service processor may begin operating as the MSP (130).

Various embodiments of the invention have been described. These and other embodiments are within the scope of the following claims.

The invention claimed is:

1. A method comprising:
   determining, with a first processor, whether the first processor is able to communicate with a second processor, wherein the first processor and the second processor are redundant processors within a multi-processor system;
   obtaining, with a polling module within the first processor, votes from components within the multi-processor system that are registered as voters with the first processor, wherein the votes are obtained when the first processor is unable to communicate with the second processor, wherein the components are external to the first processor and the second processor and ineligible to operate as a master processor for the redundant processors; and
   operating, with a master processor module within the first processor, as a master processor when the first processor is able to obtain votes from more than a predetermined portion of the voters registered with the first processor and all of the votes indicate that the first processor is eligible to operate as the master processor,
   wherein either the first processor or the second process that is not operating as the master processor operates as a standby processor;
   wherein the computing device further comprises:
      a persistent storage module associated with the first processor; and
      a persistent storage module associated with the second processor;
   wherein the master processor module comprises a registration module to
      (1) receive a request to register from a component;
      (2) instruct a standby processor to update a set of voters registered in the persistent storage module associated with the standby processor,
      (3) determine whether the standby processor successfully updated a set of voters registered in the persistent storage module associated with the standby processor; and
      (4) update the set of voters registered in the persistent storage module associated with the master processor when the standby processor successfully updated the set of voters registered in the persistent storage module associated with the standby processor;
   wherein the polling module polls voters registered in the persistent storage module associated with the master processor when the registration module determines that the standby processor did not successfully update the set of voters registered in the persistent storage module associated with the standby processor; and
   wherein the master processor module continues to operate as the master processor when the polling module is able to obtain votes from more than the predetermined portion of the voters registered in the persistent storage module associated with the master processor and all of the votes indicate that the master processor is eligible to operate as the master processor.

2. The method of claim 1, wherein operating as a master processor comprises instructing each voter registered with the master processor to record a redundancy state that indicates that the first processor is operating as a master processor and that the second processor is operating as a standby processor.

3. The method of claim 1, wherein operating as a master processor comprises:
   receiving a request to register from a component;
   instructing a standby processor to update a set of voters registered in a persistent storage module of the standby processor, wherein the standby processor is a one of the first processor or the second processor that is not operating as the master processor;
   determining whether the standby processor successfully updated the set of voters registered in the persistent storage module of the standby processor; and
   updating a set of voters registered in a persistent storage module of the master processor when the master processor determines that the standby processor successfully updated the set of voters registered in the persistent storage module of the standby processor.

4. The method of claim 3, wherein operating as a master processor further comprises:
   polling the voters registered in the persistent storage module of the master processor when the master processor determines that the standby processor did not successfully update the set of voters registered in the persistent storage module of the standby processor; and continuing to operate as the master processor when the master processor is able to obtain votes from at least the predetermined portion of the voters registered in the persistent storage module of the master processor and all of the votes indicate that the master processor is eligible to operate as the master processor.

5. The method of claim 1, wherein the components are components selected from a set of baseboard management controllers and control modules located within processing cells of a mainframe computer, wherein each of the cells includes a plurality of processors, and wherein the first processor and the second processor are service processors that manage the plurality of processors within the cells.

6. The method of claim 1, wherein obtaining, with the first processor, votes comprises obtaining a redundancy state from each of the voters registered with the first processor.

7. The method of claim 1, wherein the method further comprises:

negotiating which of the processors is to operate as the master processor, wherein the first processor negotiates when the first processor is able to communicate with the second processor; and operating the first processor or the second processor as the master processor in response to the negotiation.

8. The method of claim 1, wherein the operating, with the first processor, as a master processor comprises:

detecting a change in hardware data of the multiprocessing computing system;

instructing the second processor to write the change in the hardware data to a persistent storage module of the second processor;

writing the change in the hardware data to a persistent storage module of the first processor;

instructing each of the voters registered with the first processor to record a redundancy state, wherein the redundancy state indicates that the persistent storage module of the second processor is not current, wherein each of the voters registered with the first processor is instructed to record the redundancy state when the second processor does not successfully write the change in the hardware data to the persistent storage module of the second processor.

9. The method of claim 1, wherein the method further comprises:

discovering voters, with the first processor, when automatic redundancy is not configured;

polling the discovered voters;

determining whether all of the discovered voters approve the first processor as the master processor; and operating as the master processor when all of the discovered voters approve the first processor as the master processor.

10. The method of claim 1 wherein the predetermined portion of the voters is 50% of the voters.

11. A computing device comprising:

a first processor that is capable of performing a set of tasks;

a second processor that is also capable of performing the set of tasks;

a plurality of components that are external to the first processor and the second processor and are ineligible to operate as a master processor of the first processor and the second processor; and a communications interconnect to facilitate communication among the first processor, the second processor, and the plurality of components, wherein the first processor comprises:

a communication detection module to determine whether the first processor is able to communicate with a second processor;

a polling module to obtain votes from ones of the components that are registered as voters with the first processor, wherein the polling module obtains the votes when the communication detection module determines that the first processor is unable to communicate with the second processor; and a master processor module to operate as a master processor when the polling module is able to obtain votes from more than a predetermined portion of the voters registered with the first processor and all of the votes indicate that the first processor is eligible to operate as the master processor, wherein either the first processor or the second process that is not operating as the master processor operates as a standby processor;

wherein the computing device further comprises:

a persistent storage module associated with the first processor; and a persistent storage module associated with the second processor;

wherein the master processor module comprises a registration module to (1) receive a request to register from a component;

(2) instruct a standby processor to update a set of voters registered in the persistent storage module associated with the standby processor, (3) determine whether the standby processor successfully updated a set of voters registered in the persistent storage module associated with the standby processor; and (4) update the set of voters registered in the persistent storage module associated with the master processor when the standby processor successfully updated the set of voters registered in the persistent storage module associated with the standby processor;

wherein the polling module polls voters registered in the persistent storage module associated with the master processor when the registration module determines that the standby processor did not successfully update the set of voters registered in the persistent storage module associated with the standby processor; and wherein the master processor module continues to operate as the master processor when the polling module is able to obtain votes from more than the predetermined portion of the voters registered in the persistent storage module associated with the master processor and all of the votes indicate that the master processor is eligible to operate as the master processor.

12. The computing device of claim 11, wherein the computing device is a mainframe;

wherein the computing device further comprises a plurality of cells;

wherein each of the cells includes a plurality of processors;

wherein the first processor and the second processor are service processors that manage the cells of the mainframe; and wherein the components that are registered voters are located within the cells of the mainframe.

13. The computing device of claim 12, wherein the components are components selected from a set of baseboard management controllers and control modules located within processing cells of the mainframe.

14. The computing device of claim 11, wherein the first processor further comprises a persistent storage module to store a set of references to the voters registered with the first processor.

15. The computing device of claim 11,
wherein the first processor comprises a negotiation module to negotiate whether the first processor or the second processor is to operate as the master processor, wherein the negotiation module negotiates when the first processor is able to communicate with the second processor; and
wherein the first processor operates as the master processor when the negotiation module negotiates with the second processor that the first processor is to operate as the master processor.

16. The computing device of claim 11,
wherein the master processor module comprises a hardware detection module to detect a change in hardware data of the device, to instruct the second processor to write the change in the hardware data to a persistent storage module of the second processor, and to instruct the voters registered with the first processor to record a redundancy state that indicates that the first processor is the master processor and the persistent storage module of the second processor is not current; and
wherein the hardware detection module instructs the voters when the second processor does not successfully write the change in the hardware data to the persistent storage module of the second processor.

17. The computing device of claim 11,
wherein the first processor further comprises a voter discovery module to discover voters when automatic redundancy is not configured, to poll the discovered voters, and to determine whether all of the discovered voters approve the first processor as the master processor; and
wherein the first processor operates as the master processor when all of the discovered voters approve the first processor as the master processor.

18. The computing device of claim 11, wherein the predetermined portion of the voters is 50% of the voters registered with the first processor.

19. A mainframe computer comprising:
a plurality of cells, wherein each of the cells comprises:
    a processor cluster to perform substantive computational tasks of the mainframe computer;
    a baseboard management controller to manage an interface between system management software and hardware components of cells; and
    a control module to coordinate services performed by the processor cluster of the cell;
a first service processor capable of performing a set of service processing tasks;
a second service processor also capable of performing the set of service processing tasks; and
a means for facilitating communication among the first service processor, the second service processor, and the plurality of components,
a means for determining whether the first service processor is able to communicate with a second service processor,
a means for obtaining votes from baseboard management controllers and control modules in the cells that are registered in a persistent storage module of the first service processor, wherein the means for obtaining votes obtains the votes when the first service processor is unable to communicate with the second service processor, and
a means for automatically configuring the first service processor to operate as a master service processor when the means for obtaining votes is able to obtain votes from a predetermined portion of the voters registered with the first processor and all of the votes indicate that the first processor is eligible to operate as the master service processor,
wherein either the first processor or the second process that is not operating as the master processor operates as a standby processor;
a persistent storage module associated with the first processor; and
a persistent storage module associated with the second processor;
wherein the master processor module comprises a registration module to
    (1) receive a request to register from a component;
    (2) instruct a standby processor to update a set of voters registered in the persistent storage module associated with the standby processor,
    (3) determine whether the standby processor successfully updated a set of voters registered in the persistent storage module associated with the standby processor; and
    (4) update the set of voters registered in the persistent storage module associated with the master processor when the standby processor successfully updated the set of voters registered in the persistent storage module associated with the standby processor;
wherein the means for obtaining votes polls voters registered in the persistent storage module associated with the master processor when the registration module determines that the standby processor did not successfully update the set of voters registered in the persistent storage module associated with the standby processor; and
wherein the master processor module continues to operate as the master processor when the polling module is able to obtain votes from more than the predetermined portion of the voters registered in the persistent storage module associated with the master processor and all of the votes indicate that the master processor is eligible to operate as the master processor.

\* \* \* \* \*